United States Patent
Cho et al.

(10) Patent No.: US 8,155,956 B2
(45) Date of Patent: Apr. 10, 2012

(54) VOICE QUERY EXTENSION METHOD AND SYSTEM

(75) Inventors: Jeong Mi Cho, Suwon-si (KR); Byung-Kwan Kwak, Yongin-si (KR); Nam Hoon Kim, Yongin-si (KR); Ick Sang Han, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1029 days.

(21) Appl. No.: 12/045,138

(22) Filed: Mar. 10, 2008

(65) Prior Publication Data

US 2009/0157383 A1 Jun. 18, 2009

(30) Foreign Application Priority Data

Dec. 18, 2007 (KR) .......... 10-2007-0133727

(51) Int. Cl.
*G10L 15/26* (2006.01)
(52) U.S. Cl. .......................... 704/235; 704/8
(58) Field of Classification Search ............ 704/235, 704/8
See application file for complete search history.

(56) References Cited

U.S. PATENT DOCUMENTS

| | | | |
|---|---|---|---|
| 7,769,587 B2* | 8/2010 | Cardillo et al. ............... | 704/243 |
| 2001/0012999 A1* | 8/2001 | Vitale et al. .................... | 704/260 |
| 2004/0039570 A1* | 2/2004 | Harengel et al. ............... | 704/232 |
| 2004/0193398 A1* | 9/2004 | Chu et al. ........................... | 704/3 |
| 2005/0033575 A1* | 2/2005 | Schneider ....................... | 704/254 |
| 2005/0182629 A1* | 8/2005 | Coorman et al. .............. | 704/266 |
| 2006/0149543 A1* | 7/2006 | Lassalle ......................... | 704/235 |
| 2006/0206324 A1* | 9/2006 | Skilling et al. ................. | 704/231 |
| 2007/0005337 A1* | 1/2007 | Mount et al. ...................... | 704/2 |
| 2007/0083369 A1* | 4/2007 | McCuller ....................... | 704/254 |
| 2007/0118377 A1* | 5/2007 | Badino et al. .................. | 704/260 |
| 2008/0114598 A1* | 5/2008 | Prieto et al. .................... | 704/254 |

OTHER PUBLICATIONS

Divay et al., Algorithms for Grapheme-Phoneme Translation for English and French: Applications for Database Searches and Speech Synthesis 1997, Association for Computational Linguistics, pp. 495-523.*

Decadt et al., Optimizing phoneme-to-grapheme conversion for out-of-vocabulary words in speech recognition, Oct. 22, 2001 CNTS Language Technology Group, pp. 1-9.*

* cited by examiner

*Primary Examiner* — Jakieda Jackson
(74) *Attorney, Agent, or Firm* — Staas & Halsey LLP

(57) ABSTRACT

A voice query extension method and system. The voice query extension method includes: detecting voice activity of a user from an input signal and extracting a feature vector from the voice activity; converting the feature vector into at least one phoneme sequence and generating the at least one phoneme sequence; matching the at least one phoneme sequence with words registered in a dictionary, extracting a string of the matched words with a linguistic meaning, and selecting the string of the matched words as a query; determining whether the query is in a predetermined first language, and when the query is not in the first language as a result of the determining, converting the query using a phoneme to grapheme rule, and generating a query in the first language; and searching using the query in the first language.

15 Claims, 7 Drawing Sheets

VOICE QUERY EXTENSION METHOD AND SYSTEM

CROSS-REFERENCE TO RELATED APPLICATION

This application claims the benefit of Korean Patent Application No. 10-2007-0133727, filed on Dec. 18, 2007, in the Korean Intellectual Property Office, the disclosure of which is incorporated herein by reference.

BACKGROUND OF THE INVENTION

1. Field of the Invention

The present invention relates to a voice query extension method and system, and more particularly, to a voice query extension method and system which extends a query to improve a search result.

2. Description of Related Art

Along with the increase in mobile Internet use, a mobile terminal is widely used for web searching or downloading contents.

However, small buttons of mobile terminals are designed for portability, and thus users may not quickly input a query. For example, a webpage navigation using a direction key of a mobile terminal is slow, and synchronization between cursor movement and button input is not satisfactorily performed. Accordingly, a voice-based web interface is needed for an easy and efficient mobile web search.

Based on the above-described mobile environment, a mobile web search using voice recognition is used.

Generally, a voice recognition method extracts a feature from a user's input voice, analyzes, and retrieves most likely results from a previously registered recognition list such as a dictionary. When applying a voice recognition method to a voice-based web search, and inputting a query in foreign language, a recognition result is generated as a query.

When a query is not included in a recognition list, searching using a voice recognition method may not be performed.

Accordingly, a voice query extension method and system is needed.

BRIEF SUMMARY

An aspect of the present invention provides a voice query extension method and system which recognizes a word which is not registered in a native language dictionary using a universal dictionary, and thereby may improve a recognition success rate.

An aspect of the present invention also provides a voice query extension method and system which enables a search using a native language to be performed, even when a voiced input is in a foreign language, in order to extend a query, and thereby may improve a search success rate.

An aspect of the present invention also provides a voice query extension method and system which considers a pronunciation variation of a user in order to extend a query when a voiced input is in foreign language, and thereby may improve a search result.

According to an aspect of the present invention, there is provided a voice query extension method, including: detecting voice activity of a user from an input signal and extracting a feature vector from the voice activity; converting the feature vector into at least one phoneme sequence and generating the ("to generate") at least one phoneme sequence; matching the at least one phoneme sequence with words registered in a dictionary, extracting a string of the matched words with a linguistic meaning, and selecting the string of the matched words as a query; determining whether the query is in a predetermined first language, and when the query is not in the first language as a result of the determining, converting the query using a phoneme to grapheme rule, and generating a query in the first language; and searching using the query in the first language.

In an aspect of the present invention, the extracting and selecting matches the at least one phoneme sequence with words registered in a first language dictionary, and when a string of the matched words with a value greater than a predetermined threshold value exists as a result of the matching, selects the string of the matched words as the query, and when the string of the matched words with the value greater than the predetermined threshold value does not exist as a result of the matching, matches the at least one phoneme sequence with words registered in a second language dictionary and selects a string of the matched words as the query.

In an aspect of the present invention, the extracting and selecting matches the at least one phoneme sequence with the words registered in the second language dictionary, and when the string of the matched words with the value greater than the predetermined threshold value exists as a result of the matching, selects the string of the matched words as the query, and when the string of the matched words with the value greater than the predetermined threshold value does not exist as a result of the matching, selects a string of the matched words with a greatest value as the query.

In an aspect of the present invention, the extracting and selecting matches the at least one phoneme sequence with words registered in a universal dictionary including the first language and the second language dictionary, and when a string of the matched words with a value greater than a predetermined threshold value exists as a result of the matching, extracts the string of the matched words as the query, and when the string of the matched words with the value greater than the predetermined threshold value does not exist as a result of the matching, selects a string of the matched words with a greatest value as the query.

In an aspect of the present invention, the converting and generating applies an acoustic model, converts the feature vector into the at least one phoneme sequence, and generates the at least one phoneme sequence.

In an aspect of the present invention, the matching, extracting, and selecting applies a phone confusion matrix, and matches the at least one phoneme sequence with the words registered in the dictionary.

In an aspect of the present invention, the matching, extracting, and selecting extracts the string of the matched words with the linguistic meaning using a language model, and selects the string of the matched words as the query.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
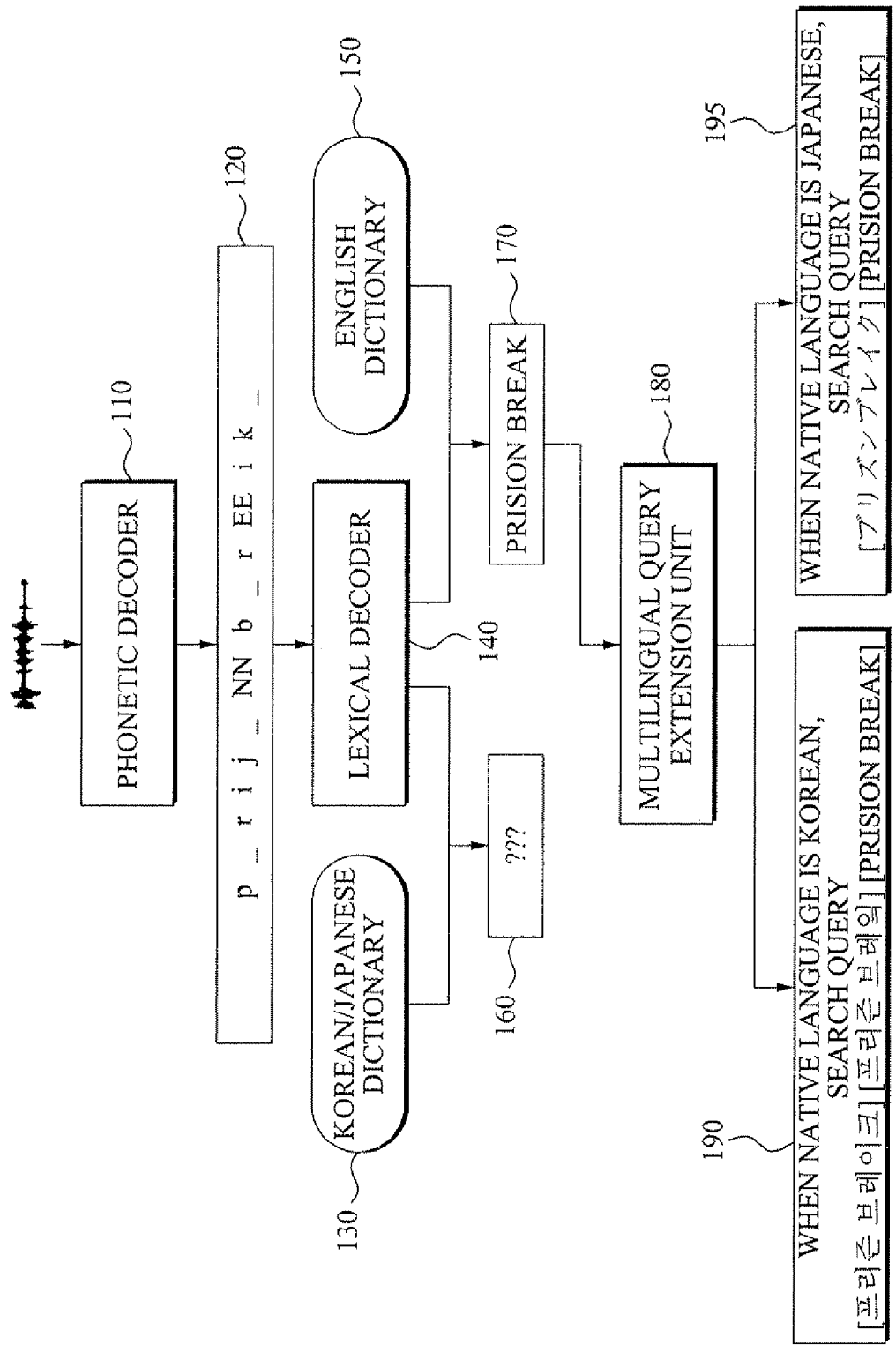
FIG. 1 is a conceptual diagram illustrating a voice query extension method according to an exemplary embodiment of the present invention.

Reference will now be made in detail to exemplary embodiments of the present invention, examples of which are illustrated in the accompanying drawings, wherein like reference numerals refer to the like elements throughout. Exemplary embodimnets are described below to explain the present invention by referring to the figures.

FIG. 1 is a conceptual diagram illustrating a voice query extension method according to an exemplary embodiment of the present invention. The voice query extension method is described in detail with reference to FIG. 1.

Generally, a voice recognition method extracts a feature from a user's input voice, and analyzes and retrieves most likely results from a previously registered recognition list, that is, a dictionary. When applying the voice recognition method to a voice-based web search, and inputting a query in a foreign language, a recognition result of the foreign language is generated as a query.

As illustrated in FIG. 1, when a Korean user inputs a voice query, "프리즌 브레이크",a phonetic decoder 110 converts a feature vector of the inputted voice query into a phoneme sequence 120 and generates the phoneme sequence 120.

A lexical decoder 140 matches the phoneme sequence 120 with words registered in a dictionary, extracts a string of the matched words with a linguistic meaning, and selects the string of the matched words as a query. However, since "프리즌"corresponding to "prison" in English and "브레이크"corresponding to "break" in English are actually non-native words to the Korean user, "프리즌 브레이크",may not exist in a Korean dictionary 160. However, since the words, "prison" and "break", are common words in English, "prison" and "break" are registered in an English dictionary 170. Accordingly, after recognizing a user's voiced input, a recognition result, "prison break", is generated. A search in Korean, a native language of the Korean user, is performed in a multilingual query extension unit 180. The multilingual query extension unit 180 generates the query using a phoneme to grapheme rule.

When a native language is Korean, "프리즌 브레이크","프리즌 브레잌","prison break", and the like may be used. Accordingly, when inputting the voice query, a non-native language and native language query may be retrieved, and thus a search success rate and satisfaction may be improved. The above-described method may be applied to other non-native languages such as Japanese 195, Chinese (not illustrated), and the like, when a non-native language voice query is inputted.

In this case, when a search is performed through a global search engine such as Google, the search is performed with respect to websites in English. That is, when the search is performed through a localized search engine such as NAVER, the search is performed with respect to websites with "prison" and "break" as an index. However, when a user is Korean, it is not clear which one of the queries, "프리즌 브레이크",and "prison break" (or "프리즌 브레잌",is intended. Accordingly, when the search is performed by applying both of the queries, "프리즌 브레이크",and "prison break", a search result that the user desires may be obtained.

Figure 2:
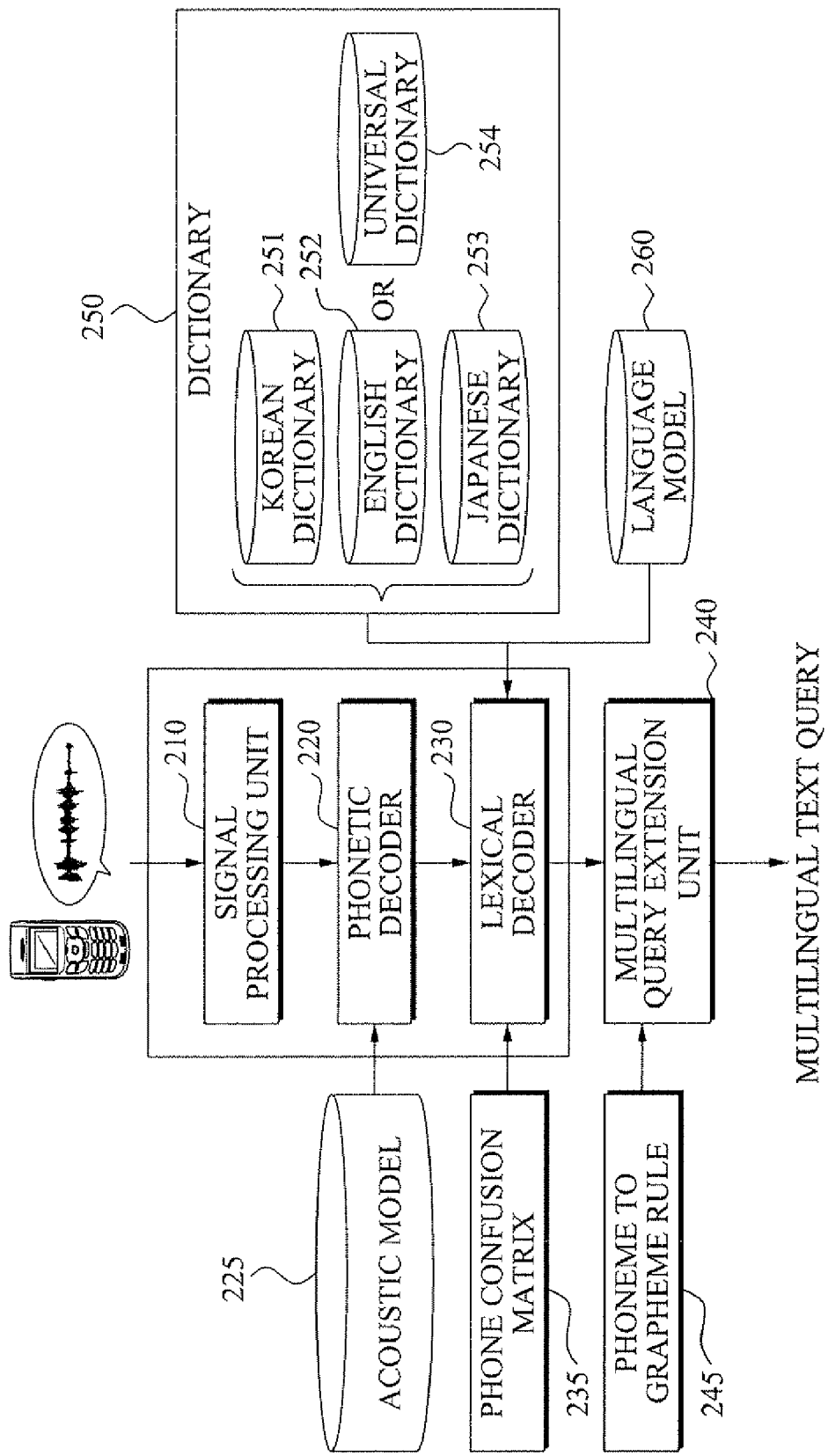
FIG. 2 illustrates a configuration of a voice query extension system according to an exemplary embodiment of the present invention.

FIG. 2 illustrates a configuration of a voice query extension system according to an exemplary embodiment of the present invention. The voice query extension system is described in detail with reference to FIG. 2.

As illustrated in FIG. 2, the voice query extension system includes a signal processing unit 210, a phonetic decoder 220, a lexical decoder 230, a multilingual query extension unit 240, and a dictionary 250.

The signal processing unit 210 detects voice activity of a user from an input signal and extracts a feature vector from the voice activity. In this instance, the signal processing unit 210 removes background noise from the input signal, detects the voice activity of the user, and extracts the feature vector to be used for voice recognition.

The phonetic decoder 220 converts the feature vector into at least one phoneme sequence and generates the at least one phoneme sequence. In this instance, the phonetic decoder 220 applies an acoustic model, converts the feature vector into the at least one phoneme sequence, and generates the at least one phoneme sequence.

The lexical decoder 230 matches the at least one phoneme sequence with words registered in a dictionary, extracts a string of the matched words with a linguistic meaning, and selects the string of the matched words as a query. The lexical decoder 230 applies a phone confusion matrix 235, and matches the at least one phoneme sequence with the words registered in the dictionary.

Specifically, the lexical decoder 230 matches the at least one phoneme sequence with words registered in a first language dictionary, for example, a Korean dictionary 251, and when a string of the matched words with a value greater than a predetermined threshold value exists as a result of the matching, selects the string of the matched words as the query. Also, when the string of the matched words with the value greater than the predetermined threshold value does not exist as a result of the matching, the lexical decoder 230 matches the at least one phoneme sequence with words registered in a second language dictionary, for example, an English dictionary 252 or a Japanese dictionary 253, and selects a string of the matched words as the query.

Also, the lexical decoder 230 matches the at least one phoneme sequence with the words registered in the second language dictionary 252 or 253, and when the string of the matched words with the value greater than the predetermined threshold value exists as a result of the matching, selects the string of the matched words as the query. When the string of the matched words with the value greater than the predetermined threshold value does not exist as a result of the matching, the lexical decoder 230 selects a string of the matched words with a greatest value as the query.

Or, the lexical decoder 230 matches the at least one phoneme sequence with words registered in a universal dictionary 254 including the first language and the second language dictionary, and when a string of the matched words with the value greater than the predetermined threshold value exists as a result of the matching, selects the string of the matched words as the query. When the string of the matched words with the value greater than the predetermined threshold value does not exist as a result of the matching, the lexical decoder 230 may select a string of the matched words with a greatest value as the query.

Also, the lexical decoder 230 may extract the string of the matched words with the linguistic meaning using a language model, and select the string of the matched words as the query.

The multilingual query extension unit 240 determines whether the query is in a predetermined first language, for example, Korean, and when the query is not in the first language as a result of the determining, converts the query using a phoneme to grapheme rule 245, and generates a query in the first language. The phoneme to grapheme rule 245 is used for considering a pronunciation variation among respective languages, and the like.

Also, the voice query extension system may further include a search unit which is not illustrated in FIG. 2. The search unit performs a search using a native language query.

Figure 3:
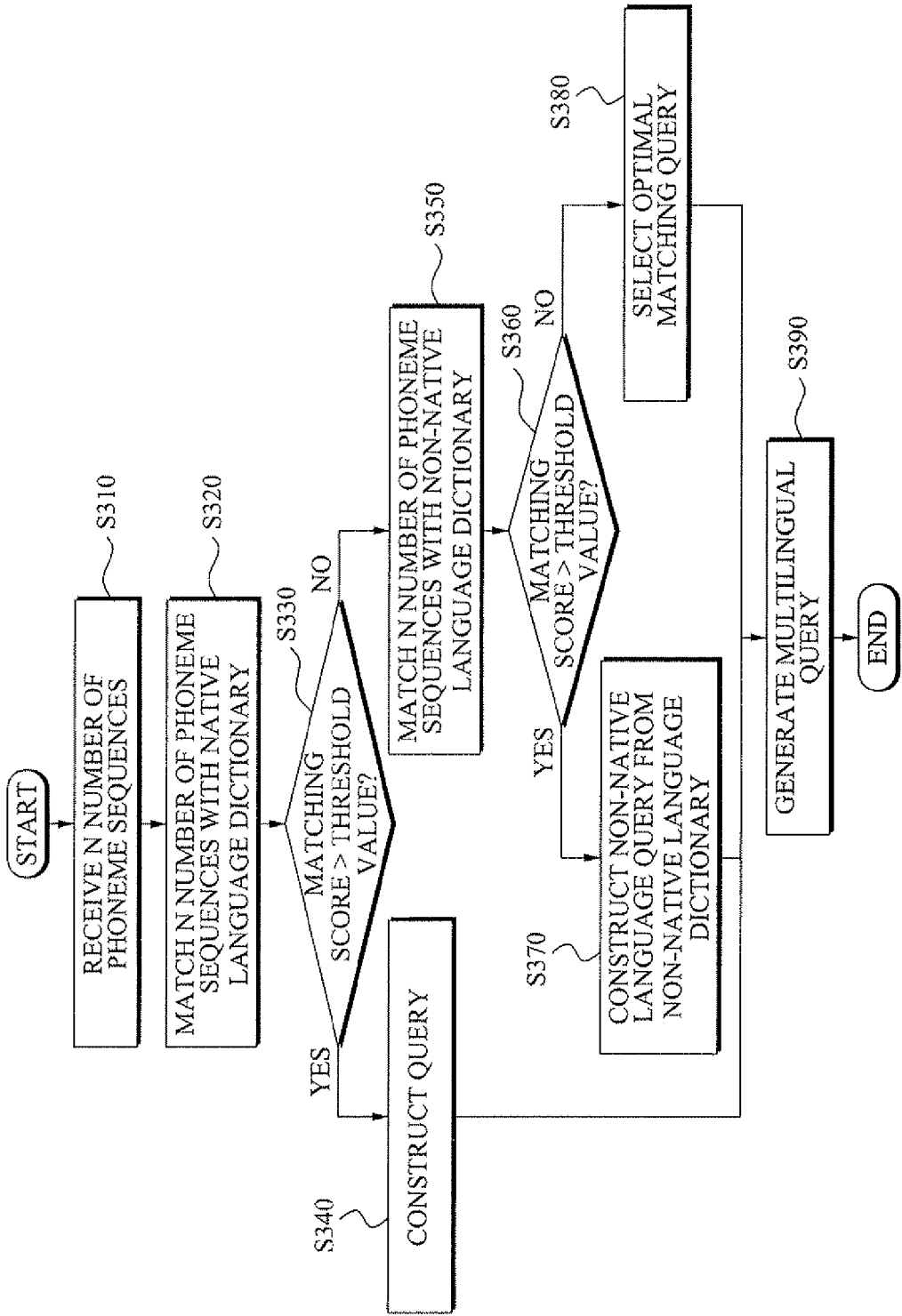
FIG. 3 illustrates a voice query extension method according to an exemplary embodiment of the present invention.

FIG. 3 illustrates a voice query extension method according to an exemplary embodiment of the present invention. Specifically, FIG. 3 is a flowchart illustrating an algorithm of a lexical decoder when a universal dictionary is incrementally applied in voice recognition.

The voice query extension method is described in detail with reference to FIG. 3.

In operation S310, the voice query extension method receives an N number of phoneme sequences. N is equal to or greater than one. In operation S320, the voice query extension method matches the received N number of phoneme sequences with a native language dictionary, For example, a Korean dictionary.

In operation S330, whether a matching score greater than a threshold value exists is determined. In operation S340, when a word with a matching score greater than a threshold value exists, the voice query extension method constructs a query from the word.

In operation S350, when the word with the matching score greater than the threshold value does not exist, the voice query extension method matches the N number of phoneme sequences with a non-native language dictionary, for example, an English dictionary.

In operation S360, whether a matching score greater than a threshold value exists is determined. In operation S370, when a word with the matching score greater than the threshold value exists as a result of the matching, the voice query extension method constructs a non-native language query from the non-native language dictionary In operation S380, when the word with the matching score greater than the threshold value does not exists as a result of the matching, the voice query extension method selects an optimal matching query. [changed to match rest of specification] In operation S390, the voice query extension method generates a multilingual query.

Figure 4:
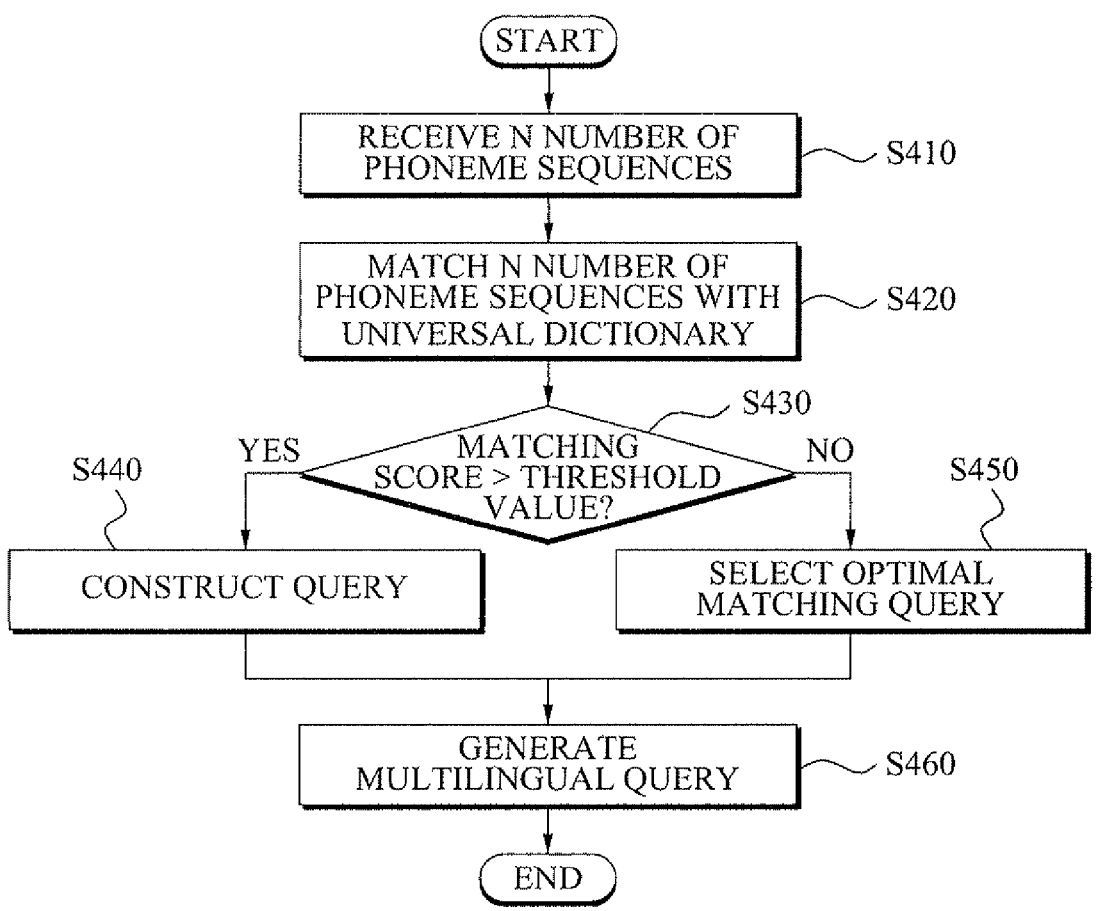
FIG. 4 illustrates a voice query extension method according to another exemplary embodiment of the present invention.

FIG. 4 illustrates a voice query extension method according to another exemplary embodiment of the present invention. Specifically, FIG. 4 is a flowchart illustrating an algorithm of a lexical decoder when a native language dictionary and non-native language dictionary are combined and applied in voice recognition.

The voice query extension method is described in detail with reference to FIG. 4.

In operation S410, the voice query extension method receives an N number of phoneme sequences. N is equal to or greater than one. In operation S420, the voice query extension method matches the received N number of phoneme sequences with a universal dictionary.

In operation S430, whether a matching score greater than a threshold value exists is determined. In operation S440, when a word with the matching score greater than a threshold value exists, the voice query extension method constructs a query from the word.

In operation S450, when the word with the matching score greater than the threshold value does not exist, the voice query extension method selects an optimal matching query. In operation S460, the voice query extension method generates a multilingual query.

Figure 5:
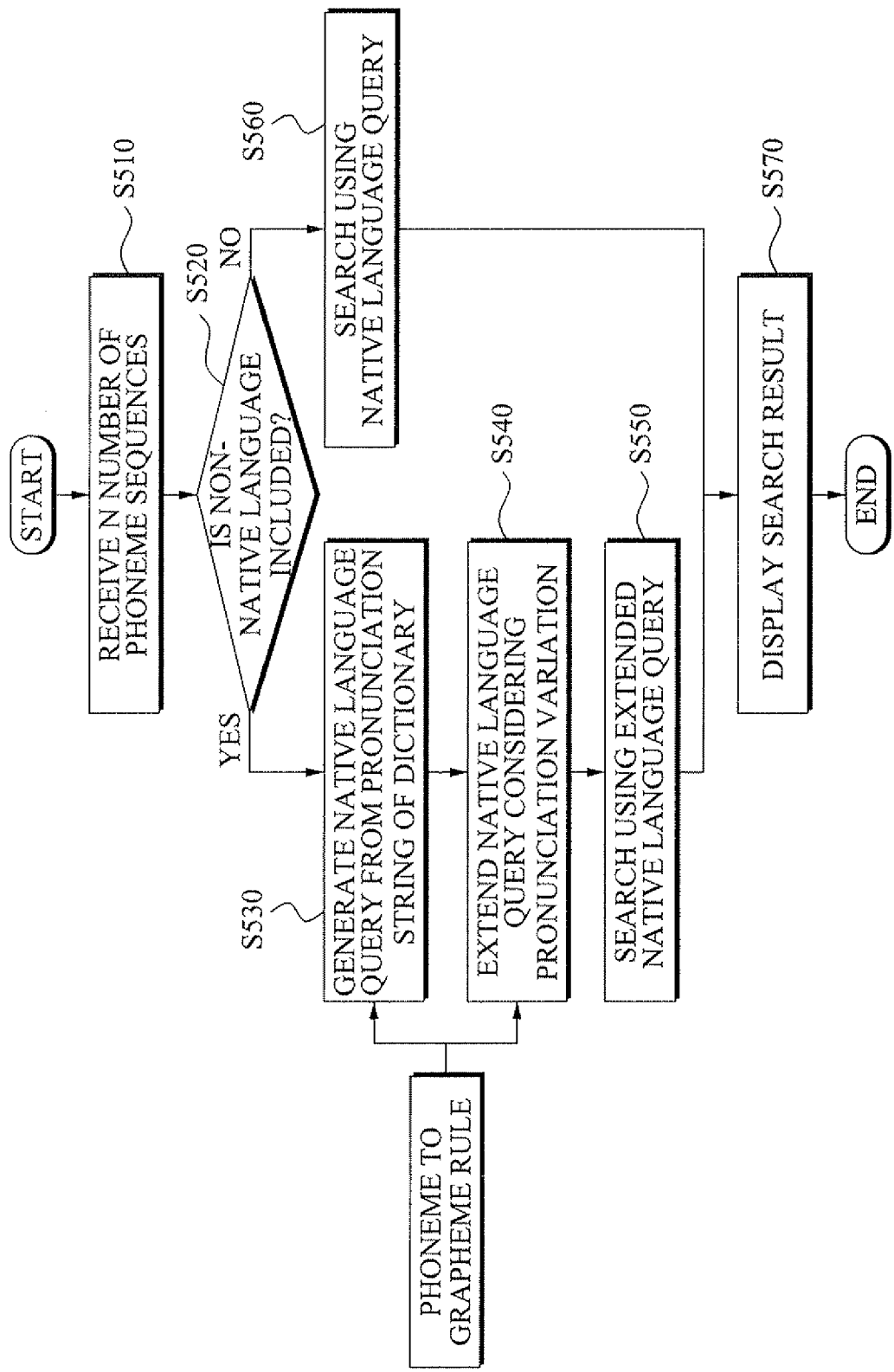
FIG. 5 illustrates a voice query extension method according to still another exemplary embeodiment of the present invention.

FIG. 5 illustrates a voice query extension method according to still another exemplary embodiment of the present invention. FIG. 5 is a flowchart illustrating an algorithmn for extending a voice query when a word which is not in a native language is included in a recognized query.

In operation S510, the voice query extension method receives an N number of phoneme sequences. N is equal to or greater than one. In operation S520, the voice query extension method determines whether a word in a non-native language, for example, English, is included in the recognized query. In operation S530, when the word in the non-native language is included in the recognized query, the voice query extension method generates a native language query, for example, a Korean query, from a pronunciation string of a dictionary by applying a phoneme to grapheme rule. The phoneme to grapheme rule is a rule converting a phoneme to a grapheme. Each language has a different phoneme set and conversion rule.

In operation S540, the voice query extension method extends the generated native language query considering pronunciation variations. For example, when voiced input "midnight blue" in English is extended to Korean, "midnight blue" may be extended to "미드나이", "미드나잇트", "블루", "블루" in Korean, and the like.

In operation S550, the voice query extension method performs a search using the extended native language query. In operation S560, when the word in the non-native language is not included in the recognized query, the non-native language is determined as a native language query and a search is performed. In operation S570, the voice query extension method displays a search result according to the search.

Figure 6:
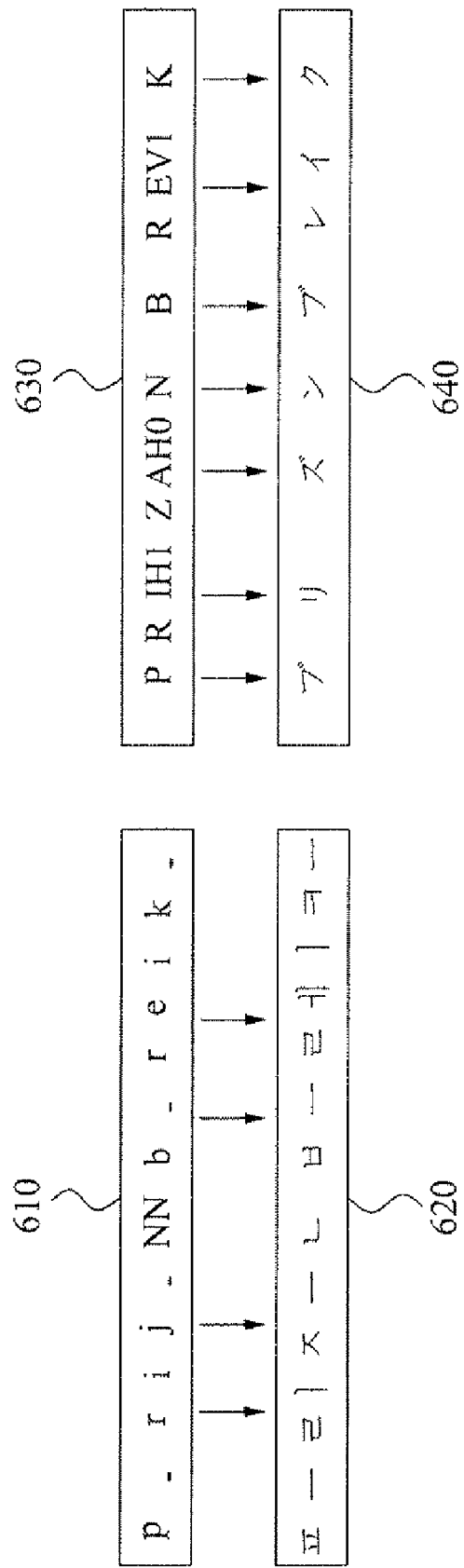
FIG. 6 illustrates a multilingual query extension algorithm according to an exemplary embodiment of the present invention.

FIG. 6 illustrates a multilingual query extension algorithm according to an exemplary embeodiment of the present invention. Specifically, FIG. 6 illustrates an extension of a Korean query and a Japanese query. The multilingual query extension algorithmn is described in detail with reference to FIG. 6.

In FIG. 6, Korean phonemes 610 and graphemes 620 corresponding to the Korean phonemes 610, and Japanese phonemes 630 and graphemes 640 corresponding to the Japanese phonemes 630 with respect to "prison break" are illustrated.

Generally, a ratio of a phoneme to a grapheme is n:m. A corresponding grapheme may vary depending on a phoneme context. Specifically, a phoneme, 'TH', may be 'ㄷ', 'ㅈ', 'ㄸ', and 'ㅆ' in Korean depending on a surrounding phoneme context, and phonemes, 'F' and 'P', may be 'ㅍ' in Korean. A generated query is extended and constructed considering pronunciation variations due to a pronunciation difference described above.

Examples of a Korean query extension according to the pronunciation variations, that is, examples of extended query through a voice query extension method according to the present invention are as follows. Such an extension occurs in other foreign languages besides Korean.

In the examples, an English voiced input is extended to Korean.

break: 브레이크/브레일
awards: 어워드/어워즈
algorithm: 알고리즘/알고리듬
midnight: 미드나이트/미드나잇
prison break: 프리즌 브레이크/프리즌 브레일
super junior: 슈퍼 주니어/수퍼 주니어
서울drama awards: 서울 드라마 어워즈/ 서울드라마어워드
midnight blue: 미드나이드 블루/ 미드나잇 블루

Also, an example of extending a Japanese voiced input to Korean is as follows.

もののけ姫: 모노노케 히메

Figure 7:
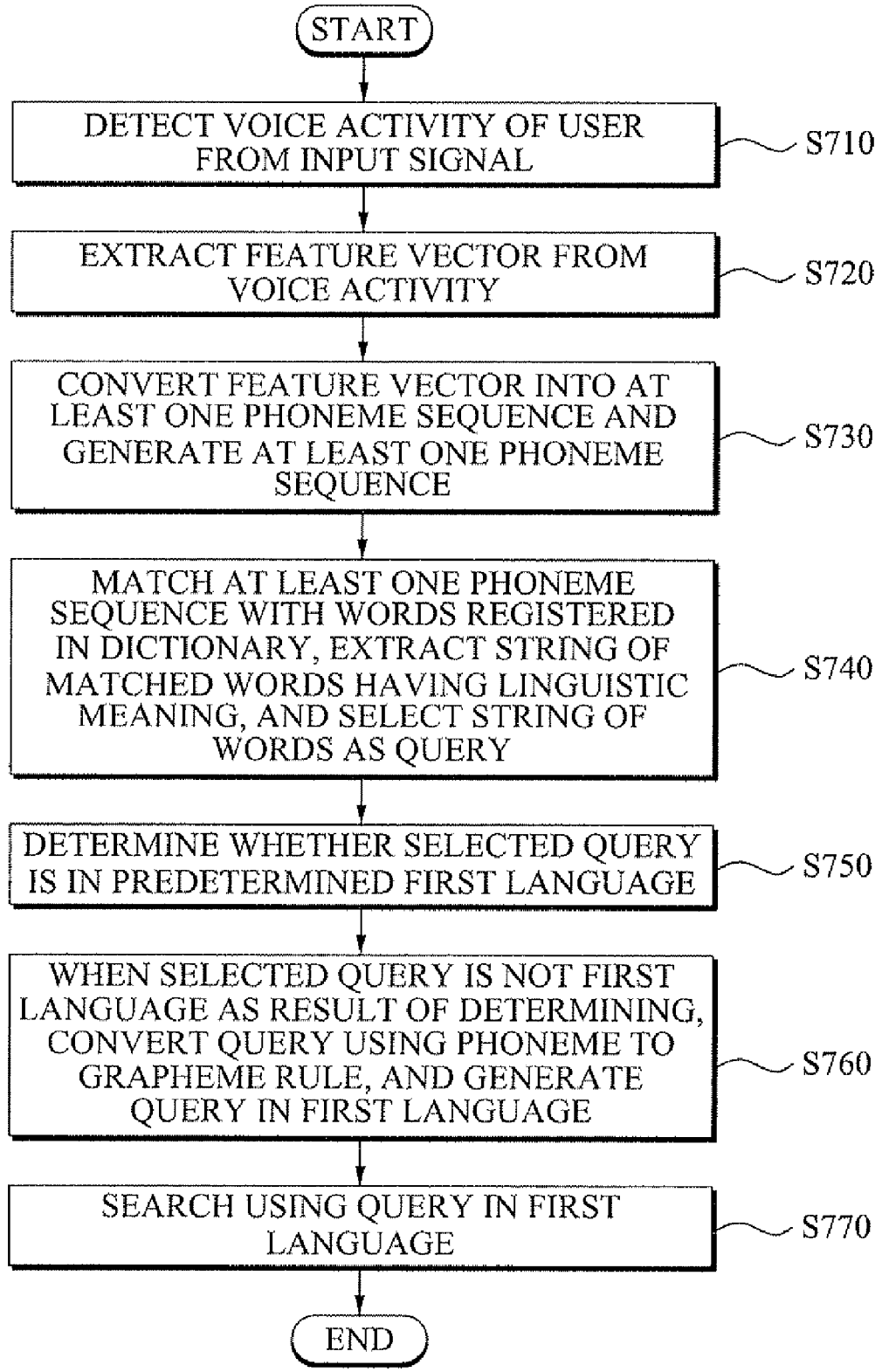
FIG. 7 illustrates a voice query extension method according to yet another exemplary embodiment of the present invention.

FIG. 7 illustrates a voice query extension method according to yet another exemplary embodiment of the present invention. The voice query extension method is described in detail with reference to FIG. 7.

In operation S710, voice activity of a user is detected from an input signal. In operation S720, a feature vector is extracted from the voice activity.

In operation S730, the feature vector is converted into at least one phoneme sequence and the at least one phoneme sequence is generated. In this instance, an acoustic model is applied to convert the feature vector into the at least one phoneme sequence and generate the at least one phoneme sequence.

In operation S740, the at least one phoneme sequence is matched with words registered in a dictionary, a string of the matched words with a linguistic meaning is extracted, and the string of the matched words is selected as a query.

In this instance, a phone confusion matrix is applied to match the at least one phoneme sequence with the words registered in the dictionary.

Also, the at least one phoneme sequence is matched with words registered in a first language dictionary, for example, a Korean dictionary. When a string of the matched words with a value greater than a predetermined threshold value exists as a result of the matching, the string of the matched words is selected as the query. When the string of the matched words with the value greater than the predetermined threshold value does not exist as a result of the matching, the at least one phoneme sequence is matched with words registered in a second language dictionary, for example, an English dictionary or a Japanese dictionary, and a string of the matched words is selected as the query.

Also, the at least one phoneme sequence is matched with the words registered in the second language dictionary. When a string of the matched words with the value greater than the predetermined threshold value exists as a result of the matching, the string of the matched words is selected as the query. When the string of the matched words with the value greater than the predetermined threshold value does not exist as a result of the matching, a string of the matched words with a greatest value is selected as the query.

According to another exemplary embodiment of the present invention, the at least one phoneme sequence is matched with words registered in a universal dictionary including the first language and the second language dictionary. When a string of the matched words with a value greater than a predetermined threshold value exists as a result of the matching, the string of the matched words is selected as the query. When the string of the matched words with the value greater than the predetermined threshold value does not exist as a result of the matching, a string of the matched words with a greatest value is selected as the query.

The string of the matched words with the linguistic meaning is extracted using a language model, and the string of the matched words is selected as the query.

In operation S750, it is determined whether the query is in a predetermined first language. In operation S760, when the query is not in the first language as a result of the determining, the query is converted using a phoneme to grapheme rule, and a query in the first language is generated. In this instance, the phoneme to grapheme rule is used to consider a pronunciation variation among languages.

In operation S770, a search is performed using the query in the first language,

According to the present invention, a voice query is not recognized as a single query in a single language, and may be extended considering a native language/non-native language as well as pronunciation variation, and thus a search result and user's satisfaction may be improved.

The voice query extension method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A voice query extension method, comprising:
   detecting voice activity of a user from an input signal and extracting a feature vector from the voice activity using a computer;
   converting the feature vector into at least one phoneme sequence and generating the at least one phoneme sequence;
   matching the at least one phoneme sequence with words registered in a language dictionary, extracting a string of the matched words with a linguistic meaning, and selecting the string of the matched words as a query;
   determining whether the query is in a predetermined first language, and when the query is not in the first language as a result of the determining, converting the query using a phoneme to grapheme rule, and generating a query in the first language; and
   searching using the query in the first language.

2. The voice query extension method of claim 1, wherein the extracting and selecting matches the at least one phoneme sequence with words registered in a first language dictionary, and when a string of the matched words with a value greater than a predetermined threshold value exists as a result of the matching, selects the string of the matched words as the query, and when the string of the matched words with the value greater than the predetermined threshold value does not exist as a result of the matching, matches the at least one phoneme sequence with words registered in a second language dictionary and selects a string of the matched words as the query.

3. The voice query extension method of claim 2, wherein the extracting and selecting matches the at least one phoneme sequence with the words registered in the second language dictionary, and when the string of the matched words with the value greater than the predetermined threshold value exists as a result of the matching, selects the string of the matched words as the query, and when the string of the matched words with the value greater than the predetermined threshold value does not exist as a result of the matching, selects a string of the matched words with a greatest value as the query.

4. The voice query extension method of claim 1, wherein the extracting and selecting matches the at least one phoneme sequence with words registered in a universal language dictionary including the first language and the second language dictionary, and when a string of the matched words with a value greater than a predetermined threshold value exists as a result of the matching, extracts the string of the matched words as the query, and when the string of the matched words with the value greater than the predetermined threshold value does not exist as a result of the matching, selects a string of the matched words with a greatest value as the query.

5. The voice query extension method of claim 1, wherein the converting and generating applies an acoustic model, converts the feature vector into the at least one phoneme sequence, and generates the at least one phoneme sequence.

6. The voice query extension method of claim 1, wherein the matching, extracting, and selecting applies a phone confusion matrix, and matches the at least one phoneme sequence with the words registered in the dictionary.

7. The voice query extension method of claim 1, wherein the matching, extracting, and selecting extracts the string of the matched words with the linguistic meaning using a language model, and selects the string of the matched words as the query.

8. At least one non-transitory computer-readable medium comprising computer readable instructions, that when executed, implements a voice query extension method, comprising:
   detecting a voice activity of a user from an input signal and extracting a feature vector from the voice activity using a computer;
   converting the feature vector into at least one phoneme sequence and generating the at least one phoneme sequence;
   matching the at least one phoneme sequence with words registered in a language dictionary, extracting a string of the matched words with a linguistic meaning, and selecting the string of the matched words as a query;
   determining whether the query is in a predetermined first language, and when the query is not in the first language as a result of the determining, converting the query using a phoneme to grapheme rule, and generating a query in the first language; and
   searching using the query in the first language.

9. A voice query extension system, comprising:
   a signal processing unit to detect a voice activity of a user from an input signal and extracting a feature vector from the voice activity using a computer;
   a phonetic decoder to convert the feature vector into at least one phoneme sequence and to generate the at least one phoneme sequence;
   a lexical decoder to match the at least one phoneme sequence with words registered in a dictionary, to extract a string of the matched words with a linguistic meaning, and to select the string of the matched words as a query;
   a multilingual query extension unit to determine whether the query is in a predetermined first language, and when the query is not in the first language as a result of the determining, to convert the query using a phoneme to grapheme rule, and to generate a query in the first language; and
   a search unit to search using the query in the first language.

10. The voice query extension system of claim 9, wherein the lexical decoder matches the at least one phoneme sequence with words registered in a first language dictionary, and when a string of the matched words with a value greater than a predetermined threshold value exists as a result of the matching, selects the string of the matched words as the query, and when the string of the matched words with the value greater than the predetermined threshold value does not exist as a result of the matching, matches the at least one phoneme sequence with words registered in a second language dictionary and selects a string of the matched words as the query.

11. The voice query extension system of claim 10, wherein the lexical decoder matches the at least one phoneme sequence with the words registered in the second language dictionary, and when the string of the matched words with the value greater than the predetermined threshold value exists as a result of the matching, selects the string of the matched words as the query, and when the string of the matched words with the value greater than the predetermined threshold value does not exist as a result of the matching, selects a string of the matched words with a greatest value as the query.

12. The voice query extension system of claim 9, wherein the lexical decoder matches the at least one phoneme sequence with words registered in a universal language dictionary including the first language and the second language dictionary, and when a string of the matched words with a value greater than a predetermined threshold value exists as a result of the matching, selects the string of the matched words as the query, and when the string of the matched words with the value greater than the predetermined threshold value does not exist as a result of the matching, selects a string of the matched words with a greatest value as the query.

13. The voice query extension system of claim 9, wherein the phonetic decoder applies an acoustic model, converts the feature vector into the at least one phoneme sequence, and generates the at least one phoneme sequence.

14. The voice query extension system of claim 9, wherein the lexical decoder applies a phone confusion matrix, and matches the at least one phoneme sequence with the words registered in the dictionary.

15. The voice query extension system of claim 9, wherein the lexical decoder extracts the string of the matched words with the linguistic meaning using a language model, and selects the string of the matched words as the query.

* * * * *